United States Patent [19]

Bitler et al.

[11] Patent Number: 5,370,724
[45] Date of Patent: Dec. 6, 1994

[54] PROCESS FOR REMEDIATION OF LEAD-CONTAMINATED SOIL AND WASTE BATTERY CASINGS

[75] Inventors: John A. Bitler, Denver; John P. Baranski, Sinking Spring, both of Pa.

[73] Assignee: Exide Corporation, Reading, Pa.

[21] Appl. No.: 149,340

[22] Filed: Nov. 9, 1993

Related U.S. Application Data

[63] Continuation of Ser. No. 973,236, Nov. 10, 1992, Pat. No. 5,284,503.

[51] Int. Cl.$^5$ .............................................. C22B 7/04
[52] U.S. Cl. ................................... 75/10.19; 75/693; 266/87; 266/172
[58] Field of Search ................. 75/10.19, 693; 266/87, 266/172

[56] References Cited

U.S. PATENT DOCUMENTS

| | | | |
|---|---|---|---|
| 1,492,241 | 4/1924 | Carpenter | 75/693 |
| 1,515,616 | 11/1924 | Popenhusen | 75/693 |
| 1,715,262 | 5/1929 | White | 75/693 |
| 2,049,633 | 8/1936 | Thomsen | 75/77 |
| 2,756,044 | 7/1956 | Neumann | 266/87 |
| 2,826,490 | 3/1958 | Neumann | 75/693 |
| 4,229,271 | 10/1980 | Prengaman et al. | 204/114 |
| 4,310,351 | 1/1982 | Lieberman | 75/693 |
| 4,340,421 | 7/1982 | Bergsoe | 75/25 |
| 4,571,261 | 2/1986 | Buren et al. | 75/77 |
| 4,877,640 | 10/1989 | Muehlberger et al. | 427/34 |
| 5,122,181 | 6/1992 | Dube et al. | 75/10.21 |
| 5,203,908 | 4/1993 | Lindsay et al. | 75/10.35 |

FOREIGN PATENT DOCUMENTS 0216618  4/1987  European Pat. Off. .

OTHER PUBLICATIONS

Royer et al., "Control Technologies for Remediation of Contaminated Soil and Waste Deposits at Superfund Lead Battery Recycling Sites", J. Air Waste Manage. Assoc., vol. 42, No. 7, pp. 970–980 (Jul. 1992).
Application of Plasma Technology in the Environmental Waste Processing Industry, CMP Report No. 92–5, Jul. 1992.
Eriksson, "The Plasmazinc Process for recovery of Zinc from Primary and Secondary Materials", Zinc '85, Ch. 52, pp. 827–839 (1985).
Bygden et al., "Application of Kellogg's Model to the Slag-Funing Practive in Sweden", Zinc '85, Ch. 11, pp. 171–183 (1985).
Bunney et al., "The Commercial Development of Plasma Technology: EAF Dust Application", AIME Conference, San Diego, Mar., 1992.
Penberthy, "Why Glass is a Good Host for Hazardous Waste", Glass Industry, pp. 22–24 (May 1992).
Roy, "Cyclone Furnace Destroys Organics, Immobilizes Heavy Metals, Radionuclides", Hazmat World, pp. 59–60 (Aug. 1992).
Wang et al., "Recovering Zn, Pb, Dc, and Fe from Electric Furnace Dust", JOM, pp. 42–45 (Apr. 1990).
"Plasma Arcs Sputter New Waste Treatment", Chem. Engineering, pp. 32–33 (Dec. 1991).
Recovering Lead from Contaminated Solids, The Hazardous Waste Consultant, pp. 1.22–1.24, Sep./Oct. 1991.
Plasma Gasification Could Set New Standards for Municipal Solid Waste Disposal, EnerSearch, Ontario Ministry of Energy.

*Primary Examiner*—Peter D. Rosenberg
*Attorney, Agent, or Firm*—Nixon & Vanderhye

[57] ABSTRACT

Lead-contaminated soil and battery casings are remediated using a plasma arc furnace which pyrolyzes the soil and waste battery casings so as to form a vitrified slag and a combustible gas, respectively. The combustible gas along with volatilized lead (and other heavy metals which may be present) are transferred to, and used as a primary fuel by, a conventional smelting furnace. The volatilized lead that is entrained in the combustible gas is thus transferred to the recovery and environmental protection/control equipment associated with the smelting furnace. The soil, on the other hand, is convened into a non-toxic (i.e., according to the Toxicity Characteristic Leaching Procedure) vitrified slag by the plasma arc which may be crushed and used as a commercial material (e.g., roadway aggregate, asphalt filler material and the like) or simply transferred to a landfill where it poses no environmental threat.

10 Claims, 1 Drawing Sheet

PROCESS FOR REMEDIATION OF LEAD-CONTAMINATED SOIL AND WASTE BATTERY CASINGS

This is a continuation of application Ser. No. 07/973,236, filed Nov. 10, 1992 now U.S. Pat. No. 5,284,503.

FIELD OF INVENTION

The present invention relates generally to a process for the remediation of lead-contaminated soil and waste battery casings. More specifically, this invention relates to a novel process whereby a mixture of lead-contaminated soil and battery casings may be pyrolyzed in a plasma arc furnace so as to volatilize the battery casings to form a combustible CO gas that is then supplied as a primary fuel to a conventional smelting furnace. A major proportion of the lead contaminant is likewise volatilized and transferred along with the combustible gas to the smelting furnace where it can then be subjected to conventional lead-recovery techniques. The soil, on the other hand, forms a vitrified slag in the plasma arc furnace and thereby serves as a non-toxic and non-leachable host matrix for any minor proportion of lead that is not volatilized.

BACKGROUND AND SUMMARY OF THE INVENTION

The safe treatment and disposal of all waste materials is demanded in most developed nations. In this regard, there is a growing demand on industry by environmentalists and government agencies to alleviate potentially toxic and/or contaminated waste disposal sites that were employed for many years prior to the public's heightened environmental concerns and the enactment of environmental legislation.

For example, a number of now defunct lead-acid battery recycling sites were operated where lead was reclaimed from spent lead-acid batteries. At most such lead-acid battery recycling sites, the primary operation consisted of breaking the battery case, draining the spent acid, and separating the battery cases from the commercially valuable lead to be recycled. The broken battery cases, which were at that time formed of a non-recyclable, hardened rubber material known in art parlance as "ebonite", were of no commercial value and were thus typically discarded as landfill waste. However, it is now known that these discarded battery cases in landfills nonetheless were contaminated with sufficient quantities of lead that could detrimentally affect the environment.

Various techniques have been proposed for the remediation of landfills containing lead-contaminated waste lead-acid battery casings. For example, The U.S. Bureau of Mines has proposed a chemical reclamation process for waste lead-acid battery casings whereby battery casing particles are carbonized by treatment in a sodium or ammonium carbonate solution followed by acid washing with nitric acetic or flurosilicic acids. See, "The Hazardous Waste Consultant", September/October 1991, pages 1.22–1.24.

Simply immobilizing the lead contamination at landfills has been identified as one possible option recently by Royer et al, "Control Technologies for Remediation of Contaminated Soil and Waste Deposits at Superfund Lead Battery Recycling Sites", Journal of Air & Waste Management Association, Volume 42, No. 7, pgs. 970–980 (July 1992). However, the authors indicate that immobilization by vitrification would be unsuitable due to the combustible nature of the casings.

It would therefore undoubtedly be desirable for a process to be proposed whereby landfill materials containing both lead-contaminated soil and waste lead-acid battery casings could be treated so as to ameliorate the environmental concerns posed by such landfill materials. It is towards providing such a process that the present invention is directed.

Broadly, the present invention is especially characterized in the treatment of lead-contaminated soil and battery casings using a plasma arc furnace which pyrolyzes the soil and waste battery casings so as to form a vitrified slag and a combustible gas, respectively. The combustible gas (which contains predominantly carbon monoxide) along with volatilized heavy metals (of which lead predominates) is directed to, and used as, a primary fuel by a conventional lead smelting furnace. The volatilized lead that is entrained in the combustible gas is thus transferred thereby to the lead recovery and environmental protection/control equipment associated with the smelting furnace. The soil, on the other hand, is converted into a non-toxic (i.e., according to the Toxicity Characteristic Leaching Procedure (TCLP) published in the Federal Register on Mar. 29, 1989, the entire content of which is expressly incorporated hereinto by reference) vitrified slag by the plasma arc which may be crushed and used as a commercial material (e.g., roadway aggregate, asphalt filler material or the like) or simply transferred to a landfill where it poses no environmental threat.

Further aspects and advantages of this invention will become apparent after careful consideration is given to the following detailed description of the preferred exemplary embodiment thereof.

BRIEF DESCRIPTION OF THE ACCOMPANYING DRAWINGS

Reference will hereinafter be made to the accompanying drawing FIGURE which schematically depicts a flow diagram for a particularly preferred process scheme according to this invention.

DETAILED DESCRIPTION OF THE PREFERRED EXEMPLARY EMBODIMENTS

Figure 1:
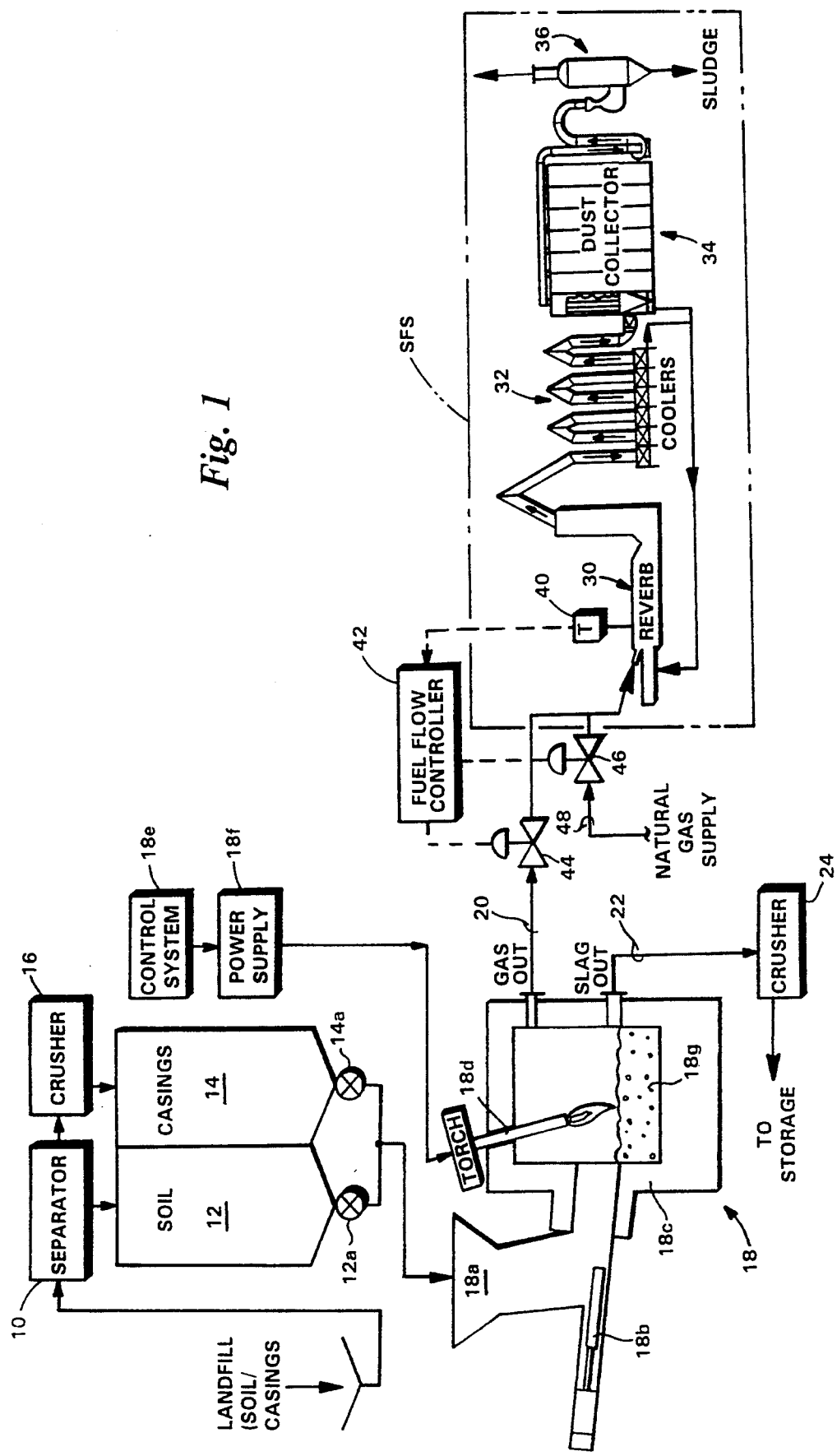

The accompanying FIGURE depicts a particularly preferred process flow diagram according to the present invention. In this connection, although the process depicted in the accompanying FIGURE operates on a batchwise basis, continuous processing of the lead-contaminated soil/battery casings according to this invention could equally be envisioned.

The soil and battery casing constituents of the landfill material are separated from one another by any suitable mechanical separatory technique (e.g., differential specific gravity apparatus, vibratory or non-vibratory screens, and the like) schematically identified as separator 10 in FIG. 1. The soil component is transferred to a soil hopper 12, while the battery casing component is transferred to a casing hopper 14. Prior to being deposited into the hopper 14. However, the casings are most preferably crushed to a suitable size (e.g., average particle size between 0.375 inch to 0.5 inch) by a crusher 16.

The soil and casings hoppers 12, 14 are provided with flow control valves 12a, 14a, respectively, so as to meter a batch charge having a predetermined ratio of soil to casings to the input hopper 18a of plasma arc furnace 18. Control of the valves 12a, 14a so as to meter the appropriate amounts of soil and casings, respectively, can be accomplished in any convenient manner, such as, by load scales associated with the hoppers 12, 14 and/or the furnace 18 which supply an input signal to a flow controller for the valves 12a, 14a.

It will be understood that the battery casings which are typically associated with lead-contaminated landfills are formed of a hardened rubber composite material conventionally called "ebonite". The composite hardened robber material can be a synthetic rubber (e.g., styrene-butadiene cross-linked with sulfur) having upwards of 40% of a carbonaceous material, such as anthracite coal or carbon black as a filler material. However, the present invention may equally be applied to landfills which may contain waste battery casings formed from a more modern polyolefinic resin (e.g., polypropylene).

The battery casings may be characterized as a solid organic material, whether formed of the discontinued ebonite material or the more modern polyolefinic material. It will therefore be understood that the greater the amount of casings in the batch charge to the plasma arc furnace 18, the greater the amount of combustible CO gas that will be produced by pyrolyzing the casings. Thus, since the combustible gas that is generated by pyrolyzing the casings is intended to be used as the primary fuel for a conventional smelting furnace system (as will be described in greater detail below), the preferred ratio of soil to casings is determined in large part by the fuel requirements of the smelting furnace system. By way of example, a smelting furnace (or other equipment intended to combustibly consume the combustible gas generated by the plasma arc furnace according to this invention) having a fuel requirement of 30×10 BTU/hr will typically dictate a soil to casings weight ratio of between about 7:1 to 5:1 being fed to the plasma arc furnace 18 in order to supply 100% of such fuel requirement.

The particular type of plasma arc furnace 18 which is employed in the practice of this invention is not particularly critical, provided that it can pyrolyze the waste battery casings. Thus, either transfer or non-transfer types of plasma arcs may be employed. Similarly, the ionizing gas that may be employed to generate the plasma arc can be any that is conventionally used for such purpose, such as, compressed air, nitrogen and/or argon.

In the accompanying FIGURE, the plasma arc furnace 18 is depicted as being a conventional batch non-transfer plasma arc type. However, as indicated previously, a transfer plasma arc type furnace could be employed, if desired. Also, the furnace 18 could be continuously operated, e.g., by providing a continuous supply of soil/casings into the furnace, and continuously removing the formed vitrified slag therefrom.

The batch plasma arc furnace 18 depicted in the accompanying FIGURE most preferably includes a hydraulic feeding ram 18b which serves to force the batch charge transferred from the hoppers 12 and 14 into the crucible 18c where it is pyrolyzed by the torch 18d. The plasma torch 18d is connected to a suitable control system 18e and direct current power supply 18f (preferably rated at at least about 350 volts and 400 amps) so as to generate a plasma flame which contacts the batch charge (noted by reference numeral 18g) in the crucible 18c.

It may be desirable to include a flux material with the mixture of soil and casings charged to the furnace 18, particularly when acidic soil is encountered, in order to reduce the soil melting point and thereby enhance its vitrification. Suitable fluxes may be, for example, blast furnace slag and/or limestone, and may be used in relatively minor quantities, e.g., up to 10 wt. %, more preferably, between about 5 to 10 wt. % of the furnace charge. In addition, the charge to the furnace can conveniently be converted to reduction conditions by the addition of a carbon source (e.g., coke breeze, coal or the like) in suitable quantities.

In order to ensure that the lead-contaminated battery casings are completely pyrolyzed by the flame of the plasma arc torch 18d, it is preferred that the batch charge 18g be agitated during its pyrolysis. Agitation can be accomplished utilizing mechanical agitators within the crucible 18c. However, since the temperature of the flame created by the plasma arc torch 18d, is typically between 4,000° to 8,000° C., agitation of the batch charge 18g may conveniently be obtained by oscillating the plasma arc torch 18d itself using suitable motor and mounting structures for the torch 18d. Oscillation of the plasma arc torch 18d will thus direct the flame along the surface of the batch charge 18g and thereby create internal flow agitation therewithin. Alternatively, agitation of the molten furnace charge may occur naturally by virtue of electrical conductance vectors of the torch.

The combustible gas which results from pyrolyzing the battery casings and the vaporized lead (as well as other vaporized metal contaminants in the soil/casings mixture) entrained thereby are transferred via line 20 to the smelting furnace system SFS. The vitrified slag, on the other hand, may be transferred via line 22 to a crusher 24 so that it may be broken into a particulate of selected size. The vitrified slag is non-toxic (i.e., since it does not test out of limits according to Toxicity Characteristic Leaching Procedure) and provides a host matrix for lead (or any other heavy metal) not volatilized during plasma arc furnace pyrolysis. Thus, the vitrified slag may be returned to a landfill without risk of environmental concerns or may be transferred to a storage site for later use as a commercial product (e.g., roadway aggregate, asphalt fill material, and the like).

As noted previously, the combustible gas resulting from pyrolyzing the battery casings is transferred to a smelting furnace system SFS which is conventionally employed in lead-smelting operations. The smelting furnace system SFS thus typically is comprised of a smelting furnace 30 (which may be a reverbatory type furnace as is shown in the accompanying FIGURE) and downstream environmental control equipment, such as a cooler section 32 (which condenses any volatilized lead not recovered in the furnace 30), dust collector section 34 (which traps finely divided lead-contaminated particulates), and a final gas scrubbing section 36. The particulates recovered from the cooler and dust collector sections 32, 34, respectively, are recycled to the inlet of the smelting furnace 30 to recover substantially all lead.

The smelting furnace 30 is fueled primarily by the combustible gas formed by the pyrolysis of the battery casings in the plasma are furnace 18. However, there may be instances where the thermal capacity of the combustible gas transferred via line 20 is insufficient to fuel the smelting furnace properly. Thus, the smelting furnace is provided according to this invention with a temperature probe 40 which measures the temperature in the furnace's combustion chamber. The temperature signal supplied by the temperature probe is fed to a fuel flow controller 42 which compares the measured temperature against a temperature set-point and issues appropriate output signals to flow control valves 44, 46, associated with combustible gas line 20 and with a natural gas supply line 48, respectively. As a result, when the temperature probe 40 detects inadequate temperature existing within the combustion chamber of the furnace 30 (indicative of inadequate combustion properties and/or inadequate flow of combustible gas introduced via line 20), the fuel flow controller 42 will then increase the flow of natural gas to the furnace 30 from supply line 48 so as to supplement flow of combustible gas in line 20. In such a manner, the furnace 30 is maintained in continuous operation, even though the plasma arc furnace (and its lead-contaminant remediation functions) are conducted in a batch-wise manner.

A further understanding of this invention will be obtained by reference to the following non-limiting Examples.

EXAMPLES

Example I

Two bench-scale tests (identified as test nos. 1-1 and 1-2) were conducted using an eight inch (8") graphite-topped crucible (capacity=0.23 ft$^3$) and a 125 KW non-transfer plasma torch. Each test included a heterogeneous batch sample weighing 3.14 pounds comprised of 2.44 pounds of soil, 0.61 pounds of battery casings (in which 50% of the case carbon value was substituted with anthracite coal), 0.08 pounds of lead sulphate and 0.007 pounds of elemental lead. The batch samples were tested to determine the amount (ppm) of various elements prior to and after pyrolysis by the plasma torch. In addition, a TCLP test was conducted on the slag to determine the quantity of lead present. In each case, the TCLP tests produced results well within the standards set forth by the U.S. Environmental Protection Agency. The results appear in Table I below.

Example II

Three tests, identified as test nos. 2-1, 2-2 and 2-3, were conducted using the same plasma torch as was employed in Example I but using a tilt furnace having a 5.5 ft$^3$ capacity and using a heat transfer of 96.25 KW-hrs/hr and a plasma flow rate of 5–10 scfm. The processing duration, material processed and material recovered from each test were as follows:

Test No. 2-1
Processing Duration: 64 minutes
Material Processed: 2×50 lb batches of mixture 2×7.5 lb batches of blast furnace slag
Material Recovered: 53 lbs of molten slag
Test No. 2-2
Processing Duration: 65.5 minutes
Material Processed: 1×22 lb blast furnace slag 3×50 lb batches of mixture
Material Recovered: 86 lbs of molten slag
Test No. 2-3
Processing Duration: 160 minutes
Material Processed: 1×22 lbs of Run No. 2 slag 7×10 lb batches of mixture
Material Recovered: 120 lbs molten slag—some probably from Run No. 2

The following procedures were followed for each test:

Test No. 2-1

The furnace was preheated to an average temperature of 1012° C. and 7.5 lbs of blast furnace slag was fed in. The preheat was continued for a further 40 minutes until the slag was completely molten and fluid—average temperature of 1095° C. (i.e., 980° C. at furnace top and 1210° C. at furnace bottom), after which 50 lbs of a mixture comprised of soil, battery cases, flux and lead sulphate was fed into the furnace without turning the plasma torch off. A large amount of flammable gas was produced which created an approximately four foot flare which sustained itself for approximately five minutes. The top and side furnace temperatures kept rising, after an initial 5° C. drop in the side temperature. The top and side furnace temperatures were 1040° C. and 1240° C., respectively 25 minutes after the first 50 lb feed, at which time another 7.5 lbs of slag was fed and six minutes afterwards. the second 50 lb feed was input. The temperatures were 1060° C. and 1240° C. at the furnace top and side, respectively. Again, a large volume of flammable gas was produced and the flare subsisted for the next approximately five minutes. There was an initial 15° C. and 25° C. drop in each of the furnace top and side temperatures and then each slowly increased to 1065° C. and 1255° C., respectively during the next 23 minutes with the exhauster pulling a low gas flow (approx. 15 scfh). At this time the pyrometer was used to record the slag melt temperature at 1450° C. Once the exhauster was turned off completely, after assuring that no hazardous gases were leaking from the furnace, the furnace top and side temperatures rose much more rapidly to 1095° C. and 1265° C., respectively. Ten minutes after the exhauster was turned off, the furnace was opened and the slag was poured into a bed of silica sand. No appreciable amount was left in the furnace. Approximately 53 pounds of slag were recovered.

Test No. 2-2

This test was commenced immediately following Test No. 1 by feeding 22 lbs of blast furnace slag through the open slag extraction door. The door was then sealed and during the next 38 minutes, the top temperature (which initially was 1065° C.) dropped to 1035° C. and then increased to 1060° C., while the side temperature increased to 1210° C. from an initial temperature of 1105° C. 50 lbs of mixed material were fed into the furnace and during the next three minutes the side temperature dropped 30° C. but regained the temperature lost within the next 7 minutes. The top temperature rose by 20° C. during the stone period of time. At this time, a low suction setting was selected for the exhauster, and then turned off. The second feed was fed into the furnace 16.5 minutes after the first feed when the furnace top and side temperatures were respectively 1090° C. and 1225° C. Again, as with the first feed and the third feed afterwards, when the product gas flow rate subsided, the exhauster was turned to low and then off and the same temperature patter, drop and regain, was observed. The third feed was fed into the furnace 18.5 minutes after the second feed when the top and side temperatures were 1120° C. and 1240° C., respectively. During the next 20 minutes, the temperatures rose to 1165° C. and 1270° C. Thirty minutes after the third feed, the furnace top and side temperatures were 1175° C. and 1300° C., respectively, after which the slag was poured into a silica sand bed. Approximately 86 lbs of material was recovered, some still not fully processed. It appeared that the large amount of material fed in one batch—3 batches of 50 lbs each—could not be processed adequately as some of the material became encapsulated by the molten mass before it could be gasified. Some slag stayed in the furnace as it quickly solidified after the top layer was poured.

Test No. 2-3

Seven batches of mixed material (i.e., soil cases, flux and lead sulphate), each weighing 10 lbs, were fed into the furnace after 22 lbs of slag for Test No. 2 were fed back into the furnace. The furnace was preheated to achieve top and side temperatures of 1130° C. and 1240° C., respectively, with an appropriate amount of flux then being fed. The preheating continued for another 27.6 minutes before the first of the 10 lb samples was fed into the furnace. The torch time (TT) was 672.6 minutes and the top and side temperatures were 1145° C. and 1240° C., respectively. The procedure that was followed for all seven samples was to wait 1 to 2 minutes until the gas production slowed down at which time the exhauster was set to low, and then two minutes afterwards, the exhauster was turned off completely. The temperatures always dipped slightly and then slowly increased, especially after the exhauster was turned off.

The data obtained from this Example II are also listed in Table I below.

TABLE I

| Test No. | 1-1 | | 1-2 | | 2-1 | | 2-2 | | 2-3 | |
|---|---|---|---|---|---|---|---|---|---|---|
| Type | Total | TCLP | Total | TCLP | Total | TCLP | Total | TCLP | Total | TCLP |
| Units | mg/kg | mg/l | mg/kg | mg/l | mg/kg | mg/l | mg/kg | mg/l | mg/kg | mg/l |
| Element/Dates | July 1992 | | | | August 1992 | | | | | |
| Lead (initial) | 21400 | — | 21400 | — | 32550 | — | 28110 | — | 26370 | — |
| Lead (final) | 107 | <0.5 | 203 | 1.37 | 4260 | .2 | 8940 | 0.2 | 10100 | 0.1 |
| Arsenic | — | — | — | — | <1.0 | <0.2 | 2.0 | <0.2 | 2.0 | <0.2 |
| Selenium | — | — | — | — | <0.5 | <0.2 | <0.5 | <0.2 | <0.5 | <0.2 |
| Antimony | — | — | — | — | 40.0 | <0.2 | <40.0 | <0.2 | 70.0 | <0.2 |
| Cadmium | — | — | — | — | <4.0 | <0.01 | <4.0 | <0.01 | <4.0 | <0.01 |

Note: All data with the "less than" symbol are lower than the limit of quantification.

As the data in Table I above indicate, lead-contaminated soil and battery casings can be pyrolyzed so as to gasify the battery casings and vitrify the soil. As a result, therefore, the gasified battery casings can be employed as a primary combustion gas of a conventional smelting furnace system such that a major proportion of the lead contaminant will be entrained by the gas and hence likewise transferred to the smelting furnace system where it can be recovered by conventional lead control apparatus/techniques. The vitrified slag which results will provide a non-leachable host for any residual lead (or other heavy metals) not gasified and transferred to the smelting furnace system and, as such, is a non-toxic material (according to TCLP tests) which can be commercialized (e.g., as a roadway material or asphalt filler) or simply returned to the landfill.

Thus, while the present invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for the remediation of landfill soil containing waste material comprising the steps of:
   (a) feeding a mixture of landfill soil and waste material into a plasma arc furnace;
   (b) pyrolyzing the mixture in the plasma arc furnace for a time sufficient to convert the waste material into a combustible gas and to vitrify the soil;
   (c) transferring the combustible gas from the plasma arc furnace to a combustion apparatus, and then
   (d) combusting the combustible gas in the combustion apparatus.

2. A method as in claim 1, which further comprises adding a carbon source to said mixture.

3. A method as in claim 2, wherein said carbon source is coke breeze or coal.

4. A method as in claim 1, wherein said waste material is lead-contaminated lead-acid battery casings, and said combustion apparatus is a lead smelting furnace.

5. A method as in claim 1, wherein said step (a) includes feeding a flux material together with the mixture of landfill soil and waste material into the plasma arc furnace.

6. A method as in claim 1, wherein said plasma arc furnace uses a transfer or a non-transfer plasma arc.

7. A method as in claim 1, wherein prior to step (a) there is practiced the steps of:
   (i) separating the soil from the waste material; and then
   (ii) metering the soil and the waste material into the plasma arc furnace in a selected weight ratio.

8. A method as in claim 1, wherein step (b) includes agitating the mixture during pyrolysis by the plasma arc furnace.

9. A method as in claim 8, wherein said step of agitating the mixture includes subjecting the mixture to mechanical agitation.

10. A method as in claim 8, wherein said step of agitating the mixture includes oscillating the plasma arc torch relative to the mixture during pyrolysis.

* * * * *